Figure 1:
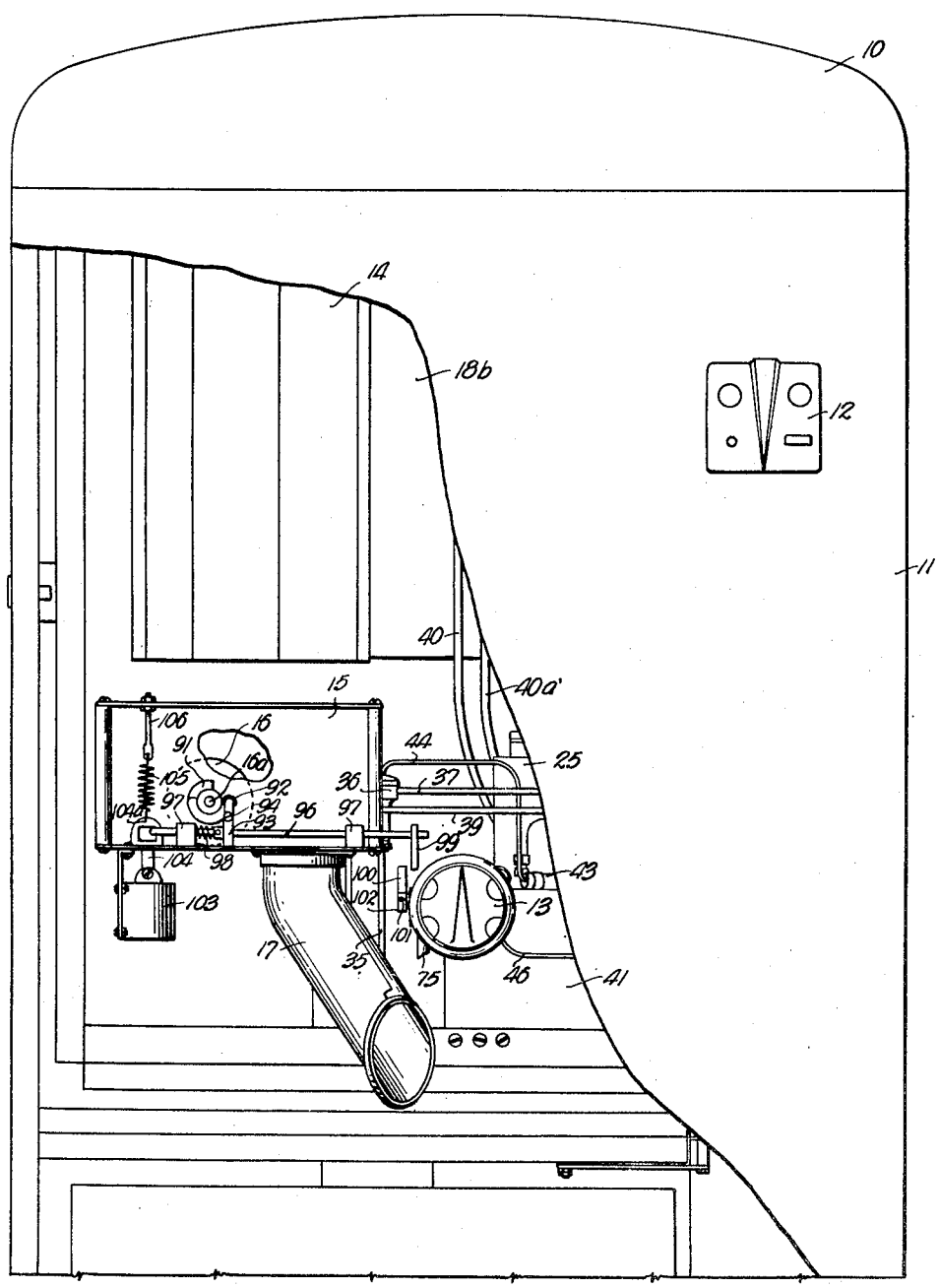

INVENTOR.
Jack J. Booth
BY Thos. E. Scofield
ATTORNEY.

Feb. 21, 1950 J. J. BOOTH 2,498,524
DRINK VENDING MACHINE
Original Filed Nov. 5, 1947 5 Sheets-Sheet 4

INVENTOR.
Jack J. Booth
BY
Thos. E. Scofield
ATTORNEY.

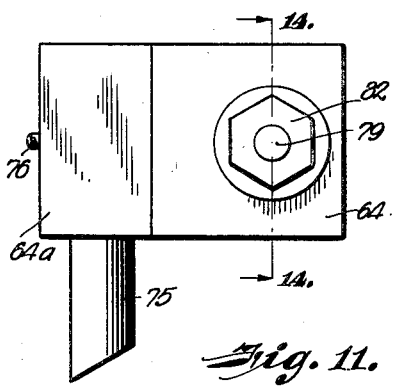
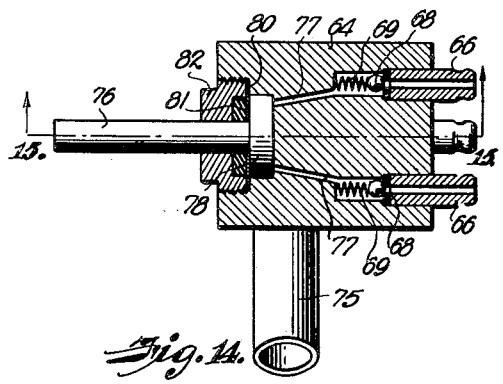
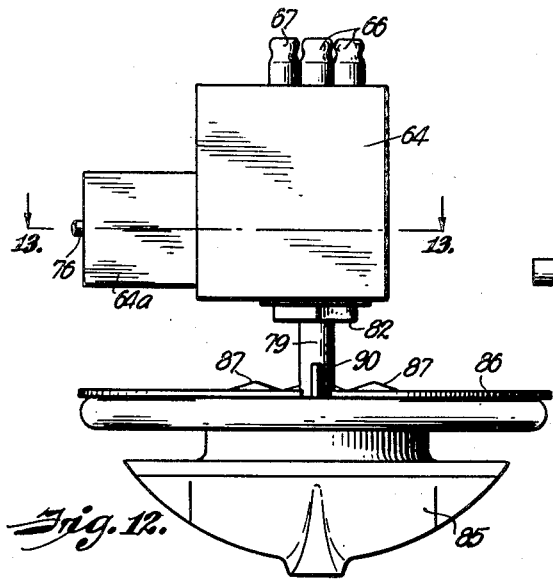
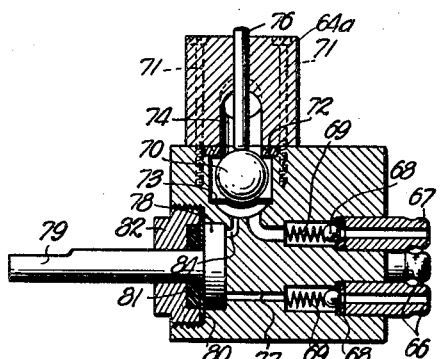
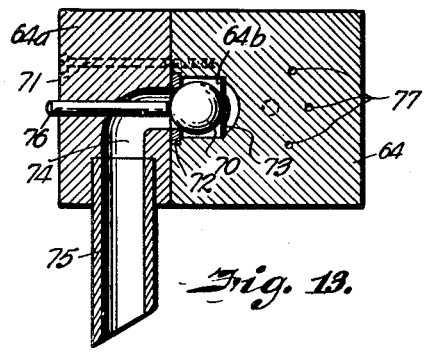
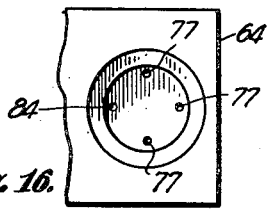
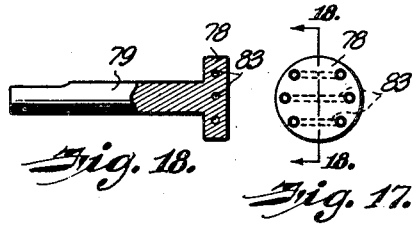
INVENTOR.
Jack J. Booth Patented Feb. 21, 1950

2,498,524

UNITED STATES PATENT OFFICE 2,498,524

DRINK VENDING MACHINE

Jack J. Booth, Dallas, Tex.

Original application November 5, 1947, Serial No. 784,177. Divided and this application May 13, 1948, Serial No. 26,769

5 Claims. (Cl. 225—21)

This invention relates to improvements in drink vending machines and refers more particularly to a machine for vending different kinds of soft drinks to the customer in an open receptacle such as a paper cup instead of a sealed or stoppered bottle. The novelty would appear to reside principally in the structural features of the carbonator, selector and mixing valve used with the machine and perhaps in the method employed in supplying the different syrups and carbonated water to the mixing valve, as well as the manner in which the drink vending apparatus is synchronized with a cup feeding mechanism and the safety features associated with the latter assemblies for preventing what is known as "jackpotting" operations.

This application is a continuation-in-part of Serial 601,266 filed June 23, 1945, and Serial 736,885 filed March 24, 1947, now abandoned, and a division of application Serial 784,177 filed November 5, 1947, now patent No. 2,455,551.

Machines have been devised and are at present in commercial use for vending selectively a plurality of different types of soft drinks and these machines deliver the drink into a cup in a cool refreshed condition. Their operation is dependent, however, upon the functioning of the complex electrical circuits by the actuation of numerous switches, solenoids, and the like which inevitably give difficulty, interrupt service, and require frequent costly repairs and maintenance.

Difficulties have been encountered in obtaining the proper degree of carbonation of water under changing temperature conditions. Stoppage of syrup delivery pipes occasioned by accumulation of solids in the pipes has been a constant aggravation. Delivery of an accurately measured quantity of the different syrups with a proportioned amount of carbonated water under all conditions is in some machines an unsolved problem. These and other sources of trouble tending to handicap efficient and satisfactory functioning of the machine has in the instant machine to a great extent been corrected and eliminated.

An object, therefore, of the invention is to provide a drink vending machine having a refrigerated carbonator with concentric coils molded in a block of heat conducting material surrounding the carbonator vessel and furnishing a graded type of cooling through the block by circulation of the refrigerant through the inner coil adjacent the vessel, the syrups through intermediate coils and incoming water to be carbonated through the outer coil.

Another object is to provide controlled cooling for the water to be carbonated and the carbonating vessel so carbonation will be uniform under all conditions and regulated to an optimum degree for the purposes intended, thereby avoiding over-carbonation accompanied by excessive foaming or dispensing of a flat tasting drink due to insufficient carbonation.

Another object is to hold the syrups under a nonoxidizing atmosphere of carbon dioxide and supply them to the mixing valve at regulated uniform pressures and temperatures so accurately measured portions will be supplied to each drink.

Another object is to provide a selector and mixing valve for combining the different syrups with the carbonated water in a manner that the syrup delivery tubes are maintained liquid full and under gas pressure to the selector valve, while the syrup discharge openings are actually washed clean with the carbonated water.

A further object is to provide a mechanism synchronized with the cup delivery unit for actuating the selector and mixing valve which automatically becomes inoperative in the event of power failure or improper functioning of other parts of the machine.

By close association of the carbonator with the selector and mixing valve and providing for uniform cooling of the syrups and carbonated water substantially to the point of delivering many difficulties now attending machines of this type are avoided.

Other and further objects will apear from the specification which follows.

Figure 2:
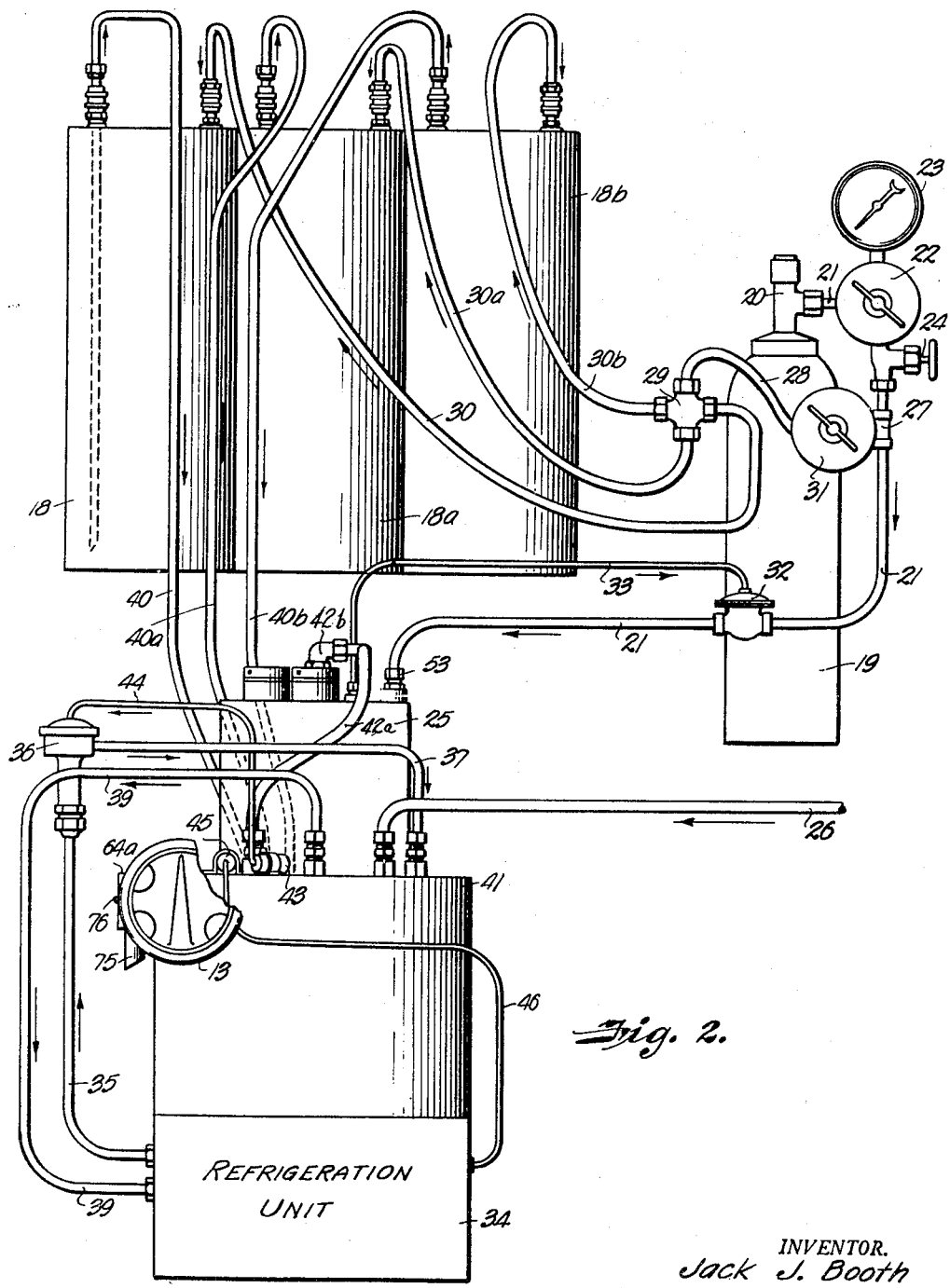
Figure 3:
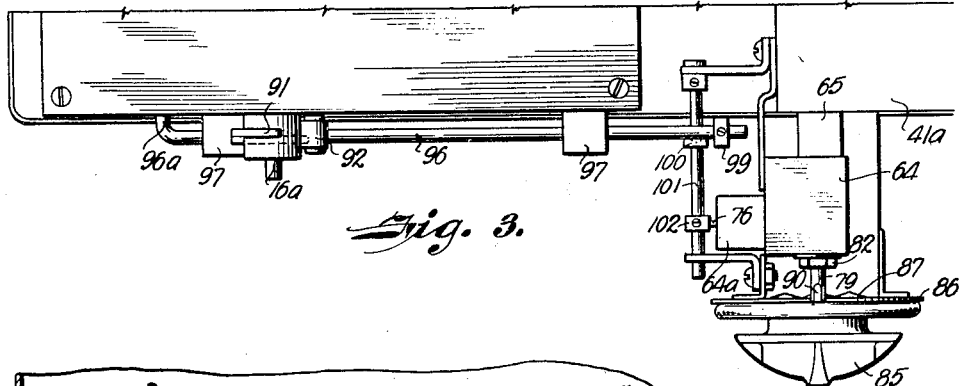
Figure 4:
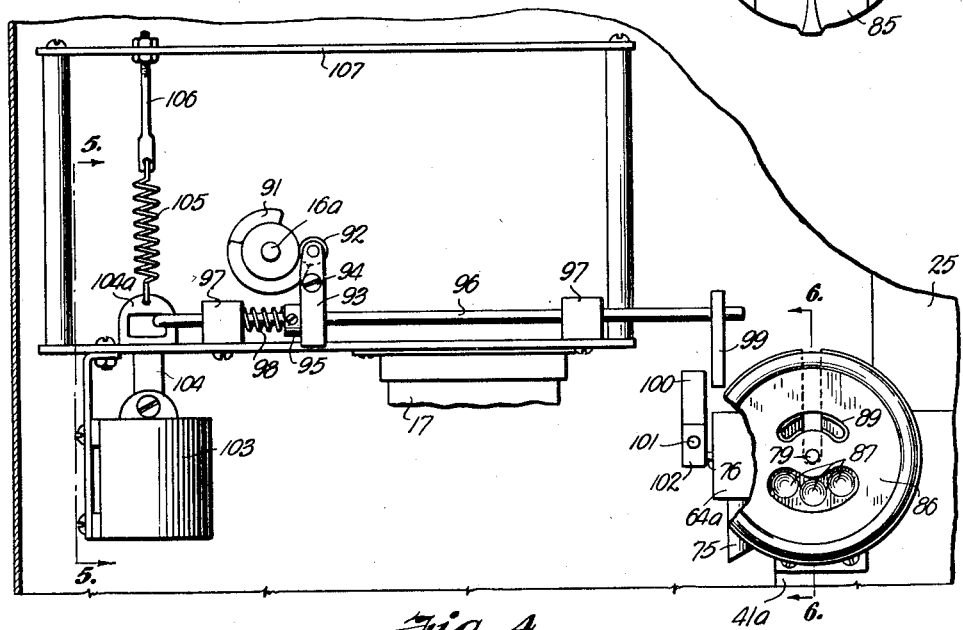
Figure 5:
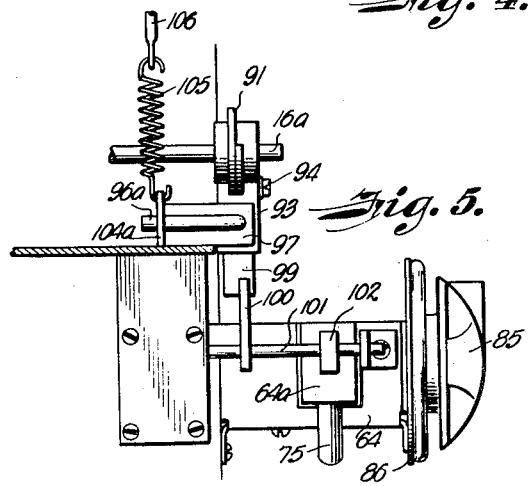
Figure 6:
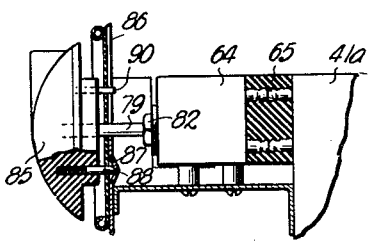
Figure 7:
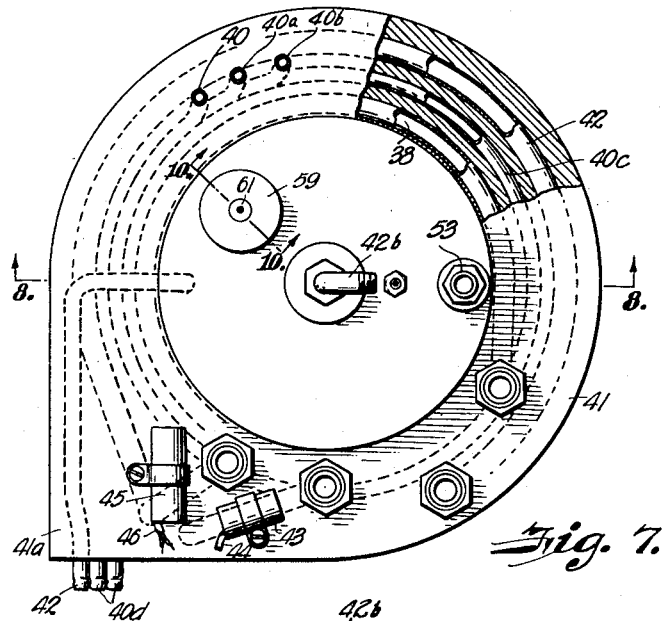

In the drawings which form a part of the specification and are to be read in conjunction therewith, Fig. 1 is a front elevational view of the upper part of a vending machine embodying the invention with a portion of the front door broken away, Fig. 2 is a diagrammatic showing of the carbon dioxide supply, syrup containers, and carbonator assembly, Fig. 3 is an enlarged plan view of the selector valve and selector valve actuating mechanism, Fig. 4 is a front elevational view of the mechanism shown in Fig. 3, Fig. 5 is a view taken along the line 5—5 in Fig. 4 in the direction of the arrows, Fig. 6 is a view taken along the line 6—6 in Fig. 4 in the direction of the arrows, Fig. 7 is a plan view of the carbonator assembly with parts broken away.

Figure 9:
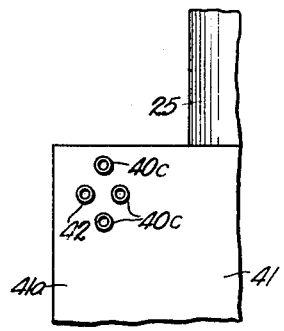
Figure 8:
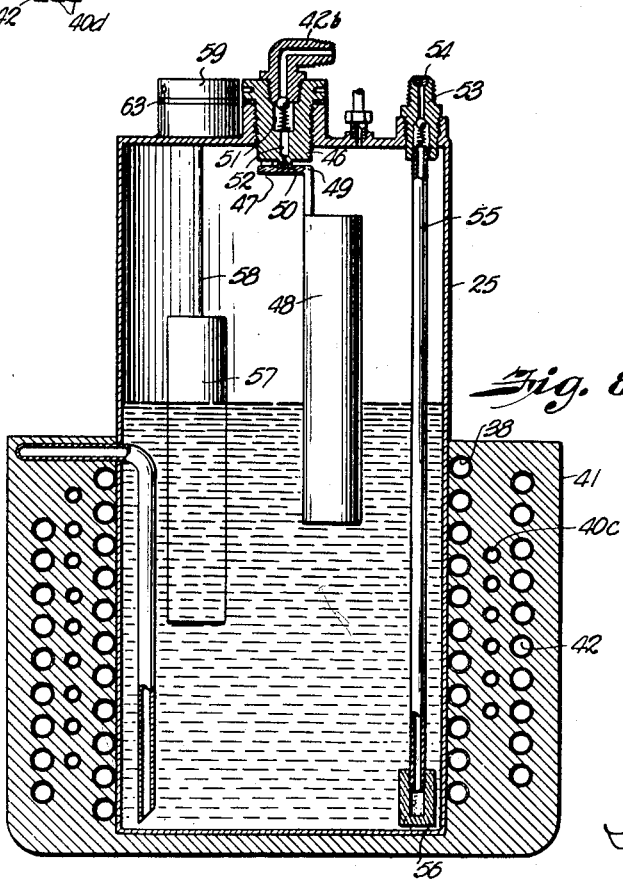
Figure 10:
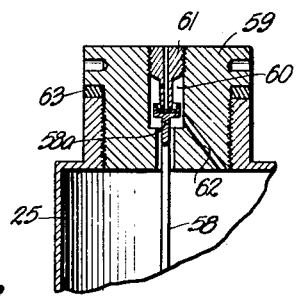

Fig. 8 is a view taken along the line 8—8 in Fig. 7 in the direction of the arrows, Fig. 9 is an elevational view of a portion of the carbonator assembly showing the extending nipples by which the selector valve unit is connected to the carbonator, Fig. 10 is an enlarged sectional detail of the snifter valve, Fig. 11 is a side view of the selector valve, Fig. 12 is a plan view of the selector valve unit and handle, Fig. 13 is a view taken along the line 13—13 in Fig. 12 in the direction of the arrows, Fig. 14 is a view taken along the line 14—14 in Fig. 11 in the direction of the arrows, Fig. 15 is a view taken along the line 15—15 in Fig. 14 in the direction of the arrows, Fig. 16 is a fragmentary front view of the selector valve body with the valve removed, Fig. 17 is a rear view of the selector valve showing the arrangement of syrup ducts or passageways, and Fig. 18 is a view taken along the line 18—18 in Fig. 17 in the direction of the arrows.

To aid and facilitate an understanding of the novel features and render the description which follows more easily comprehended, a brief explanation of the functioning of the machine is in order. Carbonic acid gas is fed from a high pressure bottle and at reduced pressure is bubbled through a tank or reservoir of water maintained under optimum conditions of temperature and pressure for proper carbonation. Gas pressure from the gas bottle is imposed upon flavoring syrup receptacles to feed and circulate the syrups in heat exchange relation with the refrigerating medium used to cool the carbonator. A manually operated selector valve permits the customer to make a choice of any of the flavors and when a coin is dropped in the machine, proportioned amounts of a syrup and carbonated water are automatically combined and dispensed in a paper cup, the coin machine operating the cup dispenser and the cup dispenser the drink mixing valve.

Referring to the drawings and particularly to Figs. 1 and 2, at 10 is shown an insulated cabinet with a front door 11 extending across the entire width of the cabinet. When the door is opened there is exposed the vending mechanism, syrup storage drums and refrigerating unit.

On the inside of the door is a coin machine of conventional type which may be provided with a coin-changing mechanism. The coin chute into which coins are inserted when a drink is purchased extends through the door of the cabinet and terminates in a slotted plate 12 on the front of the door. The selector knob or dial by which the customer chooses the drink he desires extends through an aperture in the door 11 and is diagrammatically shown at 13. Details of the operation of the selector valve will be described in connection with the explanation of Figs. 11 to 18, inclusive.

Within the upper part of the cabinet is a cup magazine 14, a cup dispensing unit 15 driven by motor 16, and a cup discharge tube 17. The end of the cup tube 17 terminates in an aperture in the door 11, not shown, provided with a recessed niche where the cup is brought to rest while the drink is dispensed. The coin machine and cup dispensing unit are of conventional design and form no part of the instant invention. Details of their structure and the electrical circuits necessary for their operation have therefore been omitted in the interest of simplifying the disclosure.

Behind the cup magazine in the upper part of the cabinet are syrup containers 18, 18a and 18b. The number of these receptacles will depend upon the number of different drinks to be dispensed. In the instant machine it is contemplated that three different flavors will be sold, for example, Coca Cola, Dr. Pepper, and root beer. The selection of drink flavors is obviously a matter for determination by the person who owns or leases the machines. Also in the upper part of the machine adjacent the syrup container is a gas bottle 19 equipped at the top with a discharge connection 20. In the high pressure discharge line 21 is interposed reduction valve 22, pressure gauge 23, a manually operated valve 24, and through this line carbonating gas is introduced into the top of the carbonating vessel 25. Tap water at system pressure in excess of 35 lbs. is supplied from any convenient source of supply through pipe 26. A T-connection 27 is interposed in pipe 21 and directs carbon dioxide gas to the syrup receptacles through pipe 28, cross connection 29 and individual pressure lines 30, 30a and 30b. A second pressure reduction valve 31 in pipe 28 reduces the pressure of the gas supplied to the separator below that supplied to the carbonator. A pressure controlled valve 32 in pipe 21 has a connection 33 into the top of the carbonating vessel 25 to regulate the supply of gas supplied to the carbonator according to pressures existing in the carbonating vessel.

In the lower part of the cabinet is a refrigerating unit diagrammatically shown at 34. Refrigerant from the unit is circulated through pipe 35, expansion valve 36, coil 38 surrounding the carbonator, thence back to the refrigerating unit through pipe 39.

The individual syrups are forced by gas pressure from containers 18, 18a and 18b through discharge pipes 40, 40a and 40b through separate cooling coils diagrammatically shown at 40c in Fig. 7. These coils terminate in nipples 40d shown in Figs. 7, 9, 12, 14 and 15. No attempt has been made in the drawings to identify the individual syrup coils embedded in casting 41. The fact is, each syrup discharge line through which syrup is delivered from the supply tanks or drums to the carbonator block connects to a fitting on top of the block and each of these fittings is attached to a separate coil in the block. In its travel through the thermal metal casting each type of flavoring or syrup makes two complete turns around the carbonator in an individual coil and is discharged from the block through nipples 40d shown in Figs. 7 and 8.

Tap water supplied to the carbonator through pipe 26 is precooled by being brought in heat exchange relation with the refrigerant passing through coil 38. Surrounding the carbonator vessel 25 and cast in intimate heat exchange relation with the periphery of the vessel is a solid annular ring or block of metal 41. Molded into this metal block adjacent the wall of the carbonating vessel is the refrigeration coil 38. Outside the refrigeration coil lie the three syrup coils 40c and water coil 42.

Carbonation

Water to be carbonated is introduced from the source of supply through pipe 26 and is circulated through coil 42 where it is cooled to an optimum carbonation temperature at the existing pressure before introduction into the carbonating vessel. An accurate control of the temperature of casting 41 is obtained by locating the thermostats controlling the refrigeration unit upon the surface of the metal block closely adjacent the carbonated water outlet and refrigerant coil outlet. Thermostat 43 has connection 44 with the expansion valve 36, best shown in Fig. 2, for regulating the amount of refrigerant circulated through the refrigerating coil 38. Thermostat 45 has connections 46 to the motor switch of the refrigeration unit and starts and stops the unit according to the cooling requirements of the system. By thus controlling the refrigeration cycle a uniform cooling of the metal block and imbedded coils is obtained grading from the coolest temperature next to the carbonating vessel to a somewhat higher temperature at the exterior surface. Thus also is the freezing of the carbonated water and incoming tap water effectively prevented. Syrup temperatures just prior to mixture with the carbonated water by this arrangement are lowered to substantially the temperature of the carbonated water so there is little or no heat absorption at the time of blending.

After being precooled in coil 42 the incoming tap water passes through pipe 42a and is discharged into the top of the carbonator through the elbow connection 42b screwed into valve body 46. Hung from the bottom of the valve body upon a support 47 is a float 48. The float hanger is a right angled member whose upper horizontal portion is a plate 49 having a recess in its top surface into which is fitted a sealing gasket 50. Centrally of the valve body 46 is a chamber 51 having communication through elbow 42b with the water supply pipe 42a. From the bottom of chamber 51 communicating with the interior of the carbonator vessel is a duct 52. The lower end of the duct has a rim or nozzle which seats against the soft gasket 50 when float 48 is in raised position as shown in Fig. 8. Within the chamber 51 is a ball check normally seated by a coil spring in the water inlet duct.

Gas inlet line 21 is likewise screwed onto a nipple 53, one end of which is threaded into a collar on the top of the carbonator. The lower part of the nipple is drilled to form a chamber in which a spring operated ball check is located, operating similarly to the check in the water inlet line. The upper part of the nipple is internally threaded to receive interchangeable plugs 54 whose orifice size govern the amount of gas admitted. The lower end of the nipple is threaded to receive gas inlet pipe 55 which has a dispersion cap 56 at its lower end. Also in the top of the carbonator is a snifter valve detailed in Fig. 10. The valve comprises a float 57 suspended on a stem 58. On the upper end of the stem is a socket member 58a and within the cup-like socket is a rubber seat. Into an internally threaded collar on top of the carbonator vessel is screwed the snifter body 59. Centrally of the body is a well 60 somewhat larger at the top than at the bottom. Through the lower restricted portion of the well extends snifter valve stem 58 with its upper socket end 58a located in the enlarged portion. Screwed into the upper threaded portion of the duct is a valve plug 61 centrally drilled providing a narrow passageway through the plug. The lower end of the plug is tapered to fit into the socket and seat against the rubber gasket in the socket end of the stem when the float is in a raised position. This seals the outlet opening to chamber 60 and passageways into the carbonator including the annular space around the stem and a diagonal duct 62 through the snifter body between the carbonator and chamber 60. Both the snifter body 59 and water valve body 46 are flanged to accommodate gaskets 63 interposed between the flanged portions of the bodies and the collars into which they are screwed.

Since water absorbs $CO_2$ gas in direct proportion to its cold temperature, the arrangement of this carbonator, the refrigeration line, casting and water line are such that the point of origin of refrigeration is directly adjacent the carbonator drum in which $CO_2$ water solidifies or freezes at about 27° F. Since the conductivity of the metal of casting is bringing heat from the extension towards the interior of the casting, the temperature differential on the outside of the casting and on the inside next to the drum is several degrees, depending upon thickness of the casting or ambient temperatures. The water cooling coil is located in the casting close to the outer surface thereof and therefore can be maintained at approximately 34° F. while the inside of the carbonator can be maintained at temperatures considerably below 32° F. In this manner, there is provided what amounts to a double cooler, that is to say, the plain water which freezes at 32° F. can be refrigerated to just above its freezing point and yet the temperature of the $CO_2$ water may be further cooled to as low as 27° F. without danger of freezing and rendering the carbonator inoperative.

As indicated, thermostatic control bulb which actuates the compressor unit is located at the point of emergence of the cold water coil or tube from the carbonator jacket which is the point of minimum temperature of the water. This is the critical point at which the plain water is likely to freeze and thus the control at this point allows the minimum temperature operation with little likelihood of freezing and insures uninterrupted operation of the carbonator and allows continuous injection of extremely cold water into the $CO_2$ gas space at the top of the carbonator drum.

It is apparent that water diffused in the $CO_2$ gas space at these low temperatures rapidly absorb $CO_2$ gas and makes possible the use of low pressures even less than conventional municipal water pressures which obviates the necessity of a water pump. The pressure is therefore controlled independently of the municipal water supply by a water pressure regulator in the system.

As the plain water is injected into the drum through the check valve and through the orifice controlled by the float, the water level, in rising gradually closes off the incoming water completely at a predetermined level, thus defining the aforesaid space above the water in which $CO_2$ gas co-mingles with the diffused water to aid in carbonation.

Simultaneously with injection of water, as described, $CO_2$ gas is passing through the orifice, check valve and tube depending in the drum, and through a fine diffusing stone from whence it bubbles upwardly through the partially carbonated water in the drum, completing the carbonating process. The restricting orifice at the top of the depending tube and the constant variation in water affluence at the float controlled orifice assures a continuous $CO_2$ water supply in the drum. Any effort to maintain a constant balance between the affluence of $CO_2$ gas and water is met with difficulties unless some variable factor were present. In this case balance is accomplished by the action of the float valve and $CO_2$ orifice in the plug 54 of nipple 53.

Since the carbonator will deliver a constant flow of carbonated water without the use of agitators and in case the pressures in the drum are slightly greater than necessary to deliver the maximum carbonation required, the internally balanced control valve 32 is located in the line delivering $CO_2$ gas to the drum and is designed to automatically close at a given pressure and will not reopen until pressure has been lowered in the carbonator. This pressure drop may be brought about by first, withdrawing $CO_2$ water through the dispensing head by absorption or by purging by means of the snifter valve.

Usually there is not sufficient absorption of $CO_2$ gas into the water in the drum to overcome the pressure differential of the control valve and thus bring about opening action of the latter, hence overcarbonation of the water does not result because of its constant exposure to higher pressures of $CO_2$ gas.

The metal block or casting 41 surrounding the carbonator vessel 25 has at one side a tangential extension 41a best shown in Fig. 7. The purpose of molding the block with this tangential portion is to keep the terminal ends of the syrup pipes and carbonated water pipe in heat exchange relation with the cooled metal and the liquids at uniform temperatures until they are discharged into the combined selector and mixing valve body 64, detailed in Figs. 11 to 18, inclusive. The joint between the thermal casting 41 surrounding the carbonator and the mixing valve is shown in Fig. 6 and consists of a soft gasket 65 preferably of rubber neoprene or other flexible insulating material. Passageways through the gasket 65 are of a size to fit over the registering nipples which extend from casting 41 and valve body 64. The close relationship of the delivery or mixing valve to the carbonator casting or jacket is highly important since even insulated fluid and gas lines absorb heat and therefore desired uniformity in temperature and carbonation can be maintained only by jacketing the carbonator drum with a metal alloy having a high degree of conduction and specific heat characteristics with the coils embedded therein in the manner described. Moreover, juxtapositioning of the mixing head in relation to the jacket allows conduction of the metal tubes and fluid therein to maintain a constant temperature in the mixing valve, which, by virtue of its peculiar design, contains but a minute quantity of fluid at all times. The selector valve itself is likewise made of plastic material of characteristically low heat conductivity and of very low specific heat content.

Selector and mixing valve

The details of the selector and mixing valve with its manually operated dial or knob are probably best disclosed in Figs. 6 and 11 to 18, inclusive. The structure includes a main body portion 64 to which is fitted spout portion 64a. Drilled into the rear of the body are three syrup ducts and a carbonated water duct. Into these ducts are fitted nipples 66 for the delivery of syrup to the body and nipple 67 for carbonated water. In each of the passageways through which the syrups and carbonated water pass in their travel through the valve body are back pressure ball check valves 68 held in place by coil spring 69. The size of the orifices through which the syrups and carbonated water pass to mixing chamber 69 and the gas pressures imposed governs the proportioning of the drink constituents when the ball valve 70 is opened in the dispensing of a drink.

As previously suggested, the spout portion 64a of the valve is fitted against the front of body 64 and is held in place by means of holding screws 71. Between the spout portion and main body portion is a gasket 72 which acts not only as a seal, but also as a seat for ball valve 70. This ball is held on its seat by a coil or pancake spring 73 which normally holds it in a seated position. Drink dispensing duct or passageway 74 connects mixing terminal 64b with the delivery spout 75. Ball valve 70 is unseated by plunger 76 acting against the force of spring 73 when a drink is dispensed. The automatic actuation of plunger 76 will be described later in connection with the dispensing valve actuating mechanism. The valve body parts are preferably constructed of plastic materials such as Lucite or the like inert to the liquids passing therethrough and relatively nonconductant to avoid heat absorption in so far as is possible.

In the valve body 64 and connecting with nipples 66 through which the syrups are introduced to the valve are three separate ducts 77 shown in Figs. 13 to 16, inclusive. These ducts terminate in a circular chamber in which is fitted selector valve disk 78 located on the rear end of a rotatable valve stem or shaft 79. In front of the disk 78 is a diaphragm 80, packing gland 81, and a packing nut 82 shown in cross section in Figs. 14 and 15. Across the back of the disk are parallel ducts 83 positioned to be brought selectively into registration with one of the syrup ducts 77 and simultaneously with short duct 84 which communicates with the mixing chamber 64b shown in Fig. 15. On the forward end of selector valve stem 79 is a dial 85 which protrudes through an aperture in the front door of the cabinet. Immediately behind dial 85 is a selector plate 86 best shown in Figs. 4 and 6 and in the face of this plate are pressed three circular depressions 87. Extending from the back of the selector dial and adapted to fit into either of the three depressions on rotation of the dial is a spring actuated pin 88. In selector plate 86 and above its center is a segmental slot 89 in which moves limiting pin 90 also extending from the rear of the selector dial 85. Pin 90 defines the limits for movement of dial 85 permitting the dial to be selectively rotated in three positions, a middle position when spring pin 88 drops into the intermediate depression 87, and two side positions when the spring pin is in registration with either of the side depressions. Thus, the customer is given his selection of any one of the three drinks by moving the dial to one of the three positions. Movement of dial 85 rotates the valve stem 79 and disk valve 78 so the selected syrup duct 77 is in registration with one of the ducts 83. In this position the opposite end of the valve duct will be in registration with duct 84 so syrup may flow through the selected flavoring duct in the body, through the cross-over duct 83 in the valve, thence into the mixing chamber through duct 84 where it is combined with the carbonated water.

Dispensing valve actuating mechanism

To dispense a drink ball valve 70 is unseated by plunger 76 through actuating mechanism operated from the cup dispensing unit as previously suggested. On the motor shaft 16a of motor 16 of the cup dispensing unit is mounted a cam 91. Riding upon the outer surface of the cam is a roller 92 carried at the upper end of cam lever 93. The cam lever is pivoted centrally at 94 so its lower end contacts collar 95 fixedly mounted on pull rod 96. Rod 96 is supported in bearings 97 and is movable longitudinally when actuated by movement of cam lever 93. Longitudinal movement of the pull rod is against the force of a compression spring 98 interposed between collar 95 and one of the bearings 97. One end of the pull rod 96 is bent at a 90° angle to form an arm designated by the numeral 96a shown in Figs. 3 and 5. On the opposite end of the pull rod is a finger 99.

When the vending machine is in condition to be operated and the power is on, pull or actuating rod 96 is in the position shown in Figs. 3, 4, and 5. When so positioned, depending finger 99 is in alignment with vertical lever 100. Lever 100 is fixedly mounted on cross shaft 101 which also carries the plunger actuating member 102. It will be seen that as the cam lever slides the pull rod longitudinally against the force of coil spring 98, finger 99 will contact vertical lever 100 and since lever 100 is fixed upon the cross shaft, the shaft will rotate causing member 102 to depress plunger 76. Depression of the plunger unseats ball valve 70 and permits the dispensing of a mixture of syrup and carbonated water through spout 75.

Beneath the opposite end of the pull rod is mounted a pull type solenoid 103 supported on suitable brackets and having an arm 104 with a slotted head 104a extending from its top. To the head is attached the lower end of tension spring 105, the upper end of the spring being hooked into link 106 supported from crossbar 107. The bent end 96a of pull rod 96 is inserted in the slotted head of the solenoid arm. When electrical energy is switched into the vending machine through circuits not shown, solenoid 103 is energized and its arm 104 is in the position shown in Figs. 4 and 5. When so positioned, finger 99 is in alignment with vertical lever 100 and longitudinal movement of the pull rod will actuate the dispensing valve as previously explained. If the power fails or electrical energy is not switched into the unit, solenoid 103 will remain de-energized and spring 105 will take effect. Coil spring 105 moves arm 96 upwardly while the solenoid arm 104 rotates pull rod 96 on its longitudinal axis, moving finger 99 out of alignment with lever 100. In this position longitudinal movement of the pull rod is ineffective to function the dispensing valve. Likewise, when the machine and solenoid are de-energized due to the completion of a drink dispensing operation or in the event of power failure, rotation of the actuating arm or pull rod 96 to an inoperative position renders the entire vending machine inoperative. This safety feature prevents "jack-potting" or successive dispensing operations on the deposit of a single coin.

*Drink dispensing operation*

The mechanism described is mounted in a heavily insulated steel cabinet and the coin machine is connected to the cup dispensing unit by conventional electrical circuits, including electrical connections to solenoid 103. These circuits are conventional and are omitted from the drawings in the interest of simplicity. Pipe 26 has been connected to a water supply delivered at pressures in excess of 35 lbs. A bottle of carbonic acid gas has been installed at 19 and syrup receptacles 18, 18a, and 18b have been filled with suitable flavoring syrups. The refrigeration unit 34 is started and metal block 41 surrounding the carbonator is being cooled by circulation of the refrigerant through coil 38. As soon as the temperature of the casting 41 has been reduced, water is introduced through pipe 26 and precooled by circulation through coil 42. In a precooled condition it is introduced into the top of the carbonator since float 48 is in a lowered position. As the water is jetted from the small nozzle at the bottom of valve body 46, it is dispersed into a fine spray upon contact with plate 49 conditioning it for more rapid absorption of the carbonic acid gas. Simultaneously with the introduction of the water, the gas is introduced into the top of the carbonator through pipe 21 and is passed at a controlled rate through orifice plug 54 into the bottom of the carbonator through pipe 55. Gas disperser 56 at the bottom of the pipe distributes the gas uniformly throughout the body of water in the carbonating vessel.

During the initial stages of carbonation, the float 57 attached to the bottom of the snifter valve stem will keep valve 58a at the bottom of chamber 60. This permits air and gas to discharge freely through duct in plug 61 until the level of the water raises the snifter valve float and closes the valve. In the event of a shortage of water in the carbonator tank 25, for any reason, such as restrictive orifices, low pressure on water supply or freezing, the snifter valve will automatically drop to position where $CO_2$ gas will escape, relieving the higher pressure of $CO_2$ gas and allowing the lower pressure of water to refill the tank when normal supply is resumed. Also, discharge of gas manually from the top of the drum may be effected by depressing the float valve 58a from its seat, as by a short length of wire inserted through the orifices in the plug 61. As the level of the water in the carbonator rises, float 48 will lift closure plate 49 to shut off the water supply. Typical conditions for proper carbonation of the water are water temperatures of approximately 35° F. and pressures ranging from 30 to 35 lbs. per square inch.

A separate supply of gas is directed through pipe 28 at reduced pressures of the order of 25 to 30 lbs. into each of the syrup receptacles. The fittings on top of the syrup receptacles to which the gas inlet and liquid discharge pipes are connected are equipped with quick action couplers. These couplers have check valves which function on disengagement of one of the lines from a receptacle to prevent gas and syrup from being discharged from the $CO_2$ drum 19 but releases $CO_2$ gas pressure from the top of the syrup drum from which the line is detached, pressure in the remaining drums being undisturbed. Each of the syrup lines, likewise has a separate flow check valve. These preventive measures are essential to avoid accidental discharge of the flavoring syrups when syrup drums are being exchanged or syrup lines disengaged for repair or for other purposes.

With carbon dioxde pressure imposed on the drums, oxidation and off-tastes of the flavoring is reduced to a minimum. The syrups are delivered from the drums through pipes 40, 40a and 40b, circulated through cooling coils 40c and in a cooled condition are delivered to the selector and mixing valve.

A customer desiring a drink from the machine moves dial 85 to one of its three selected positions. Above the dial appear indicia designating the type of flavors available. When moved to the selected position pin 88 on the back of the dial falls into one of the depressions 87 and one of the three parallel ducts 83 on the rear face of disk 78 registers simultaneously with the selected syrup duct 77 and with discharge duct 84.

Insertion of a coin in the slot provided in plate 12 on the outside of the machine actuates starting switch of motor 16 on the cup dispenser. A paper cup is discharged from the cup dispenser magazine through tube 17 into a niche or recess provided in the front of the cabinet. During the cup dispensing operation roller 92 moves across the cut-out portion of cam 91. When the cup has been delivered beneath spout 75 cam 91 will have rotated to a position for actuation of cam lever 93. With solenoid 103 energized the mechanism is in condition for a drink dispensing operation, and further rotation of the cam tilts lever 93 on pivot 94, contacting collar 95 and moving pull rod 96 against the force of compression spring 98. The longitudinal movement of the rod 96 causes finger 99 to trip vertical lever 100 and rock the cross shaft 101. Rotation of the cross shaft tilts valve actuating lever 102 depressing plunger 76 and unseating ball 70 from its seat 72. As the ball is unseated, carbonated water is discharged into the mixing chamber 64b to be there mixed with the selected syrup supplied through respective ducts 77, 83 and 84. After combination in the mixing chamber the blended fluids are discharged through spout 75 into the drinking cup not shown.

The period during which ball valve 70 is unseated is fixed by the size of cam 91 and the speed of its rotation. These factors provide an accurate control for the amount of liquid dispensed, while the orifice sizes in the valve body for the syrups and carbonated water regulate the proportioning of the respective liquid constituents dispensed with each drink.

It will be noted that the different flavoring syrups are passed through separate ducts in the selector valve and the only common duct is passageway 84 between the selector valve and mixing chamber 64b. This tiny duct contains but a fraction of a drop of syrup and is flushed back when each drink is mixed by superior pressure of $CO_2$ water acting backwardly through duct 84 and pressing ball 68 on its seat. Thus contamination with syrup of a different flavoring is rendered inconsequential and cannot be detected. Closure of the mixing chamber by the ball valve and the presence of supplemental check valves 68 in the syrup and carbonated water lines assure gas-tight closures for the system and a nonoxidizing atmosphere of carbonic acid gas in any space unoccupied by liquid after a drink has been dispensed.

Thus it will be seen that there has been provided a drink vending machine in which the carbonator is maintained under controlled conditions of temperature and pressure, assuring optimum carbonation of the water. The incoming water is precooled and the carbonated water and syrups supplied to the mixing valve are maintained at a uniform cool temperature necessary for the dispensing of a satisfactory beverage. The syrup storage drums and delivery lines are maintained under the pressure of a nonoxidizing atmosphere up to the time the syrups are discharged into the mixing valve. An accurate proportioning of the carbonated water and syrups assures the dispensing of a uniform drink to the customer and since temperatures and pressures throughout the system are carefully regulated difficulties from this source in the proportioning of the liquids has been eliminated. The casting of the coils through which the refrigerant, incoming water, and syrups are circulated in a block of metal surrounding the carbonator provides a simple and effective means for transferring refrigerant temperatures to the dispensed respective liquids. Finally, the structural features of the combined selector and mixing valve, as well as the safety mechanism for operating the mixing valve, and preventing its operation when electrical power to the machine has failed or has been cut off, provide automatic features which render the machine substantially foolproof.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

Having thus described my invention, I claim:

1. In a beverage dispensing mechanism, in combination; a water carbonator comprising a diffusing vessel having an inlet connected to a source of water, a $CO_2$ inlet pipe into the vessel connected to a $CO_2$ supply, a block of heat conducting metal about the diffusing vessel and in heat exchange relation therewith, separate passageways in said block having the form of concentric coils arranged one within another, a refrigerating unit having connections with the innermost coil to pass a refrigerant therethrough, the source of water connected to an outer coil, said outer coil discharging into the diffusing vessel and a pipe for discharging carbonated water from the vessel.

2. A water carbonator as in claim 1 with a thermostatic control for the refrigerating unit responsive to a heat-sensitive element, said element positioned in heat exchange relation with the block where the incoming water passes from the precooling coil in the block to the carbonating vessel, whereby the temperature of the liquid in the diffusing vessel may be maintained lower than the liquid in the outer coil.

3. A water carbonator and carbonated water-syrup mixing and dispensing unit comprising a diffusing vessel having a water inlet connected to a source of water, a $CO_2$ inlet into the vessel connected to a $CO_2$ supply, a syrup supply, a block of heat-conducting metal about the diffusing vessel and in heat exchange relation therewith, separate passageways in said block for circulating fluids about the vessel, a refrigerating unit having connections with one passageway whereby a refrigerant is circulated in proximity with the diffusing vessel and said passageway, a second passageway connected with the water supply and to the water inlet to the diffusing vessel, a third passageway connected to the syrup supply, a pipe embedded in the block for discharging carbonated water from the diffusing vessel, said syrup passageway and carbonated water discharge pipe terminating in short relatively parallel tubes extending from the block and in close proximity with one another, a carbonated water-syrup mixing and dispensing unit, tubular extensions from said unit corresponding with those extending from the block, a resilient coupling having passageways registrable with the respective tube extensions and adapted to be manually and simultaneously engageable with said tube extensions from the block and mixing and dispensing unit.

4. A carbonator as in claim 1, a source of flavoring syrup, a separate flavoring syrup coil in the heat conducting metal block about the diffusing vessel and connections for circulating the refrigerant through the innermost coils, the water through the coil encircling the refrigerant coil and flavoring syrup through the syrup coil.

5. In a beverage dispensing mechanism, in combination; a water carbonator comprising a diffusing vessel having an inlet connected to a source of water, a $CO_2$ inlet pipe into the vessel connected to a $CO_2$ supply, a block of heat conducting metal about the diffusing vessel and in heat exchanging relation therewith, separate passageways in said block having the form of concentric coils arranged one within another, a refrigerating unit having connections with the innermost coil to pass a refrigerant therethrough, a source of flavoring extract, connection for circulating the refrigerant through the innermost coil and water and flavoring extract separately through the outermost coils, one of said outer coils having water circulating therethrough discharging into said diffusing vessel, and a pipe for discharging carbonated water from the diffusing vessel.

JACK J. BOOTH.

REFERENCES CITED

The following references are of record in the file of this patent:

UNITED STATES PATENTS

| Number | Name | Date |
|---|---|---|
| 1,990,325 | Hopkes | Feb. 5, 1935 |
| 2,396,460 | Di Pietro | Mar. 12, 1946 |

FOREIGN PATENTS

| Number | Country | Date |
|---|---|---|
| 146,875 | Austria | Aug. 25, 1936 |